United States Patent

Griesinger et al.

(10) Patent No.: US 7,322,723 B2
(45) Date of Patent: Jan. 29, 2008

(54) MULTIFUNCTIONAL ILLUMINATION DEVICE

(75) Inventors: Manfred Griesinger, Leonberg (DE); Markus Hartlieb, Walddorfhaeslach (DE); Wilhelm Kinces, Esslingen (DE); Hans-Georg Leis, Esslingen (DE); Siegfried Rothe, Denkendorf (DE)

(73) Assignee: DaimlerChrysler AG, Stuttgart (DE)

( * ) Notice: Subject to any disclaimer, the term of this patent is extended or adjusted under 35 U.S.C. 154(b) by 263 days.

(21) Appl. No.: 10/539,943

(22) PCT Filed: Dec. 9, 2003

(86) PCT No.: PCT/EP03/13917

§ 371 (c)(1),
(2), (4) Date: Jun. 17, 2005

(87) PCT Pub. No.: WO2004/054842

PCT Pub. Date: Jul. 1, 2004

(65) Prior Publication Data

US 2006/0072334 A1    Apr. 6, 2006

(30) Foreign Application Priority Data

Dec. 18, 2002   (DE)   ................. 102 59 185

(51) Int. Cl.
    *B60Q 1/00*  (2006.01)
(52) U.S. Cl. ............. 362/464; 362/276; 362/545; 250/239; 250/553; 257/82
(58) Field of Classification Search ............. 250/552, 250/553, 239; 257/82; 362/276, 460, 465, 362/545, 555
See application file for complete search history.

(56) References Cited

U.S. PATENT DOCUMENTS

| 4,051,365 | A | * | 9/1977 | Fukuyama et al. ......... 250/239 |
| 4,972,089 | A | * | 11/1990 | Stevenson .................. 250/239 |
| 5,463,384 | A |   | 10/1995 | Juds |

FOREIGN PATENT DOCUMENTS

| DE | 32 44 358 A1 | 6/1984 |
| DE | 298 06 638 U1 | 7/1998 |
| DE | 100 62 103 A1 | 7/2002 |
| EP | 0 764 916 A1 | 3/1997 |
| EP | 1 113 216 A2 | 7/2001 |
| WO | WO 98/54030 A1 | 12/1998 |
| WO | WO 99/42856 A2 | 8/1999 |
| WO | WO 00/15462 A1 | 3/2000 |
| WO | WO 01/98708 A1 | 12/2001 |

* cited by examiner

*Primary Examiner*—Stephen F Husar
(74) *Attorney, Agent, or Firm*—Akerman Senterfitt; Stephan A. Pendorf; Yonghong Chen

(57) ABSTRACT

An illumination device has an illumination means formed by an arrangement of a plurality of semiconductor light sources (2) grouped together to form a field. Sensor elements (3) are arranged at individual positions of the field instead of the semiconductor sources (2). A multifunctional headlight can thus be advantageously created. The headlight can be embodied as a robust, compact, low-space unit. By virtue of the fact that the light sources (2) and the sensor elements (3) do not necessarily use the same lens system (1) i.e. each individual element of the multifunctional headlight can be provided with an individually designed lens system (1), the beam path of the illumination device can be separated from the field of vision of the sensor system and can thus be determined independently over large areas.

17 Claims, 1 Drawing Sheet

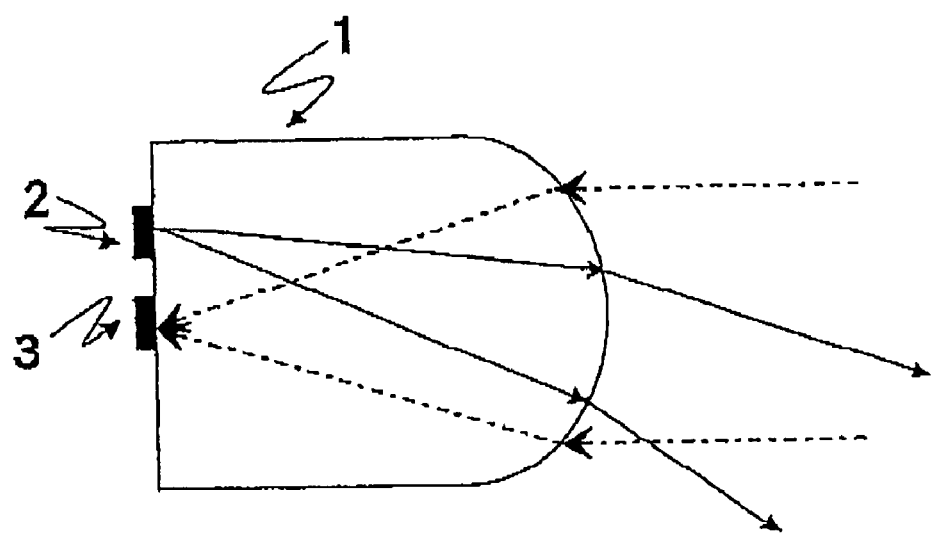
Fig. 1
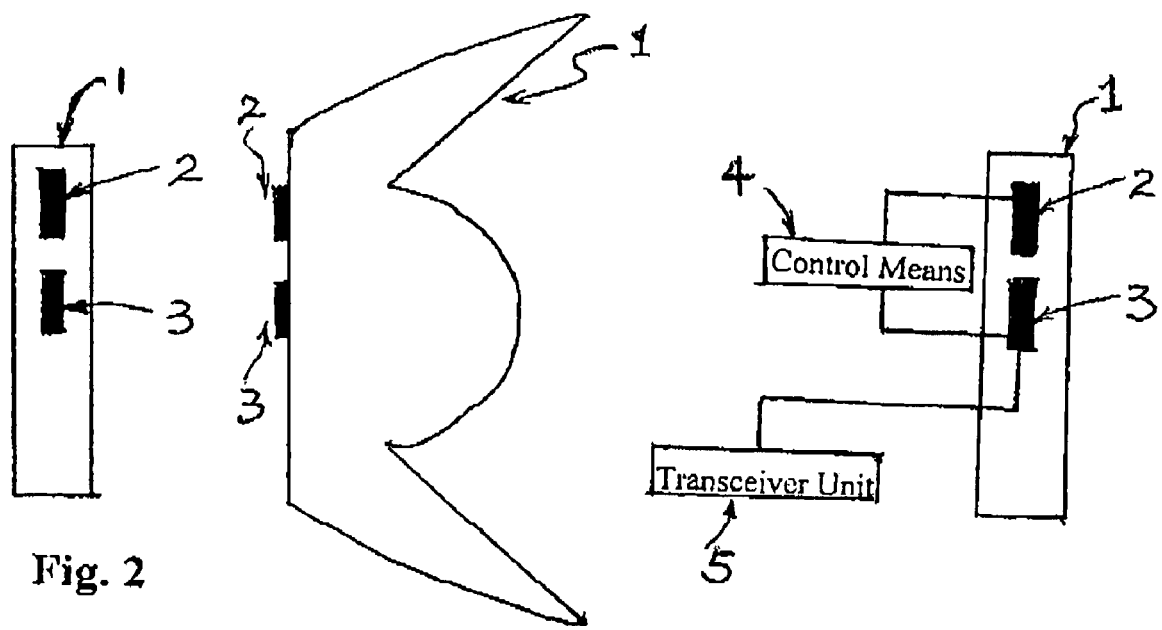
Fig. 2
Fig. 3
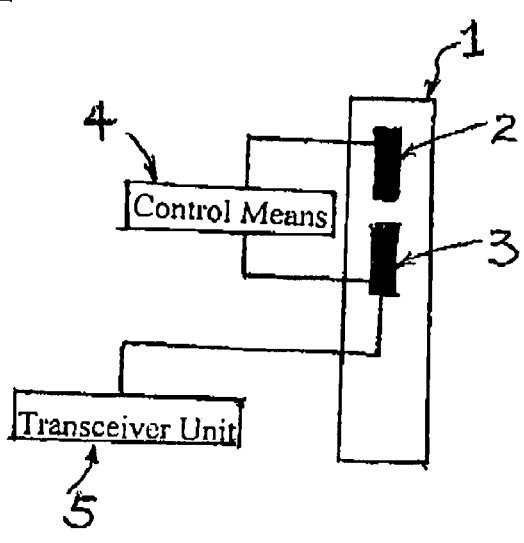
Fig. 4

MULTIFUNCTIONAL ILLUMINATION DEVICE

This application is a national stage of PCT/EP2003/013917 filed Dec. 9, 2003 and based upon DE 102 59 185.7 filed Dec. 18, 2002 under the International Convention.

BACKGROUND OF THE INVENTION

1. Field of the Invention

The invention relates to a multifunctional illumination device and a method for operating such a device.

2. Related Art of the Invention

For the purpose of improving safety in road traffic, in addition to conventional illumination equipment modern vehicles have additional sensor systems, which directly or indirectly support the vehicle driver and are intended for observing the surroundings of the vehicle, particularly with regard to the early detection of dangerous situations. These include, in particular, radar systems for detecting the range and relative speed of objects, or else night vision improvement systems that are based on the illumination of the road surroundings with infrared light. These systems are generally designed as independent systems and are integrated in a spatially separate fashion as additional components alongside illumination and signaling systems on the vehicle.

A compact design of ambient sensors and motor vehicle headlamps is described in document DE 196 32 252 A1. Described herein is a vehicle headlamp that has a housing in common with a sensor device. The headlamp is arranged in the housing downstream of a diffusion lens covering the light exit opening. The sensor device is also likewise arranged downstream of the same diffusion lens, the diffusion lens being specifically adapted in this region to the optical requirements of the sensor.

In a similar way, document DE 197 31 754 A1 shows a combination of a conventional motor vehicle headlamp with a distance sensor. Here, the sensor signals are directed via a mirror located in the headlamp such that it is possible to make common use of the optical and mechanical components for beam passage, beam shaping and beam deflection by headlamp and sensors.

In the case of these combined arrangements of headlamps and sensor devices, it is necessary to arrange the light source and sensor in a fashion clearly separate in space in order to avoid reciprocal influence. If, nevertheless, the aim is to implement a spatially compact design, this is possible only with the aid of delicate mirror arrangements that can also be severely damaged even in the event of trivial accidents of no importance occurring in road traffic.

A spatially compact integration of a photodetector of an optical distance measurement device in a headlamp is exhibited in JP 06-325296 A. The light source of the headlamp and the photodetectors are arranged in this case offset from one another downstream of a common lens such that the beam paths of the two sensors are separated from one another and therefore do not influence one another reciprocally. However, the compact, robust design results here in a restricted variability in the design of the possible beam paths.

SUMMARY OF THE INVENTION

Starting from the prior art, it is the object of the invention to provide a multifunctional illumination device that can be implemented in a compact design and in the case of which the path of radiation of the illumination and sensor device can be freely determined in a very wide range.

The solution within the scope of the first embodiment of the invention provides that the luminous means of the illumination device are formed by an arrangement of a multiplicity of semiconductor light sources grouped to form an array, and that sensor elements are arranged instead of the semiconductor light sources at individual positions of this array. It is thereby possible to provide advantageously a multifunctional headlamp that can be implemented in a robust design as a compact unit in a very small space. Since the light sources and the sensor elements no longer need to necessarily use the same optical system, but each individual element of the multifunctional headlamp can have an individually fashioned optical system, the beam path of the illumination device can be separated from the field of view of the sensors, and can be fixed independently of one another within wide ranges.

The selection of suitable semiconductor light sources is not restricted here to those that emit light in the physical wavelength region. Rather, the most varied semiconductor light sources that emit light in different wavelength regions can conceivably be used. Thus, in particular, it is possible to conceive an advantageous combination of semiconductor light sources that emit visible and infrared light.

In the case of semiconductor light sources that emit light in the nonvisible region, in particular, it is conceivable for them to be used for different purposes. One of the main objects could be their use as source of illumination within a system for improving visibility, while another expedient application resides in their use as transmitting sources in a transceiver arrangement. It is equally conceivable here to use one and the same light source or group of light sources both as illumination source and as transmission source, or else in each case to assign one or the other task (illumination task or transmission task) permanently to specific light sources or groups of light sources.

In the case of use within a transceiver arrangement, the sensor elements integrated in the multifunctional headlamp advantageously function as receivers. However, the receivers could also be located at different objects in the surroundings of the multifunctional illumination device; thus, for example, on other vehicles for the purpose of enabling vehicle-to-vehicle communication, or at receiver points of fixed location, for example for recording information in conjunction with automatic road toll systems. This means that with reference to the transceiving functionality of a multifunctional illumination device the latter can form a closed unit per se, in which case it is generally necessary to operate the mutually assigned light source and the sensor elements in a synchronized fashion with one another. However, it is also possible, nevertheless, for a pair or a multiplicity of illumination devices taken together to form a flexible unit in the case of which the number of associated transceiver components changes continuously with time. In such a flexible configuration, the individual spatially separated communication elements generally work in an asynchronous operating mode with one another.

In order to implement a design of the multifunctional illumination device that is as compact as possible, the individual optics that are assigned to the semiconductor light sources or the individual sensors are designed to be as flat as possible and have as small a cross-sectional surface as possible on the side where they are connected to the semiconductor light sources or sensors. Thus, it is possible to achieve a packing density of optical and sensor elements that simultaneously permits a high radiation density and a high sensor sensitivity. In particular, the radiation density and the sensitivity can thereby be raised for specific applications when these applications are not implemented with the aid of individual elements, but when a number of elements (semiconductor light sources or sensors) are interconnected for this purpose to form groups. This grouping can both be performed permanently, for example by hard-wiring, or else be fashioned flexibly within the context of targeted control and selection.

A compact design of the multifunctional illumination device can be implemented in a particularly advantageous way by selecting upstream of the individual semiconductor light sources optical systems in the form of a two-dimensional Cartesian oval, as also described in the patent application DE 102 49 819.9, which is not a prior publication. The optical systems are designed in this case to be as flat as possible such that the light entry opening of the optical system has an elongated, substantially rectangular shape. It is advantageous in this case when the optical system has perpendicular to the light entry surface a central region whose projection into a two-dimensional plane corresponds to a cylindrical 2-dimensional Cartesian oval. A Cartesian oval is a geometrical surface that, as boundary surface of a refracting medium, collects the light emanating from a focal point in a second focal point even for large aperture angles. In order to make even better use of light emanating from the semiconductor light source, the light exit surface of the optical system, which is formed in the shape of a Cartesian oval, can be combined with a parabolic reflector.

BRIEF DESCRIPTION OF THE DRAWINGS

FIG. 1 is a cross sectional view of an optical system according to the present invention;

FIG. 2 is a side view of the optical system showing the light entry opening;

FIG. 3 is a cross sectional view of another embodiment of the optical system according to the present invention; and FIG. 4 is a diagrammatic illustration of a control means for switching light sources and sensor elements or for operating the sensor elements in a fashion synchronized with the light sources, and a transceiver unit connected to the sensor elements.

DETAILED DESCRIPTION OF THE INVENTION

The multifunctional illumination device can be fashioned in a particularly advantageous and compact way aimed at efficiency by assigning at least individual optical systems a number of semiconductor light sources or sensor elements. In such a case, one optical system acts on the individual light sources and sensors in a different way such that these exhibit different emission characteristics and reception characteristics. In practice, this can frequently be utilized extremely advantageously, for example by positioning a semiconductor light source at an optical system such that when functioning as a lower beam it illuminates the area right in front of a vehicle, while the sensor is positioned at the optical system such that can detect signals from regions further away in front of the vehicle. Such an arrangement is shown by way of example in a diagrammatic illustration of FIG. 1 relating to this application. FIG. 1 shows the cross section of an optical system (1) that is generally of flat design and at whose light entry surface there are arranged, firstly, a semiconductor light source (2) and, secondly, a sensor element (3). The sensor element can be, for example, a photodiode or a millimeter wavelength antenna (MMIC or SIMWIC component) implemented on a substrate. Owing to the optical properties of the optical system, the beam path and the light source (2) and the receiving range of the sensor element (3) are separated from one another and directed toward different regions in the surroundings of the multifunctional illumination device; here, directly in front of the vehicle in the lower beam region, and for the purpose of determining visibility, for example, in remote regions. The individual optical systems have a central region whose projection into a two-dimensional plane corresponds to a cylindrical 2-dimensional Cartesian oval, as clearly show in FIG. 1. The optical systems are designed as flat elements whose light entry openings have an elongated, substantially rectangular shape (see FIG. 2). The central region of the optical systems can be combined with a parabolic reflector (see FIG. 3). The illumination device may also have a control means (4) for enabling the light sources and the sensor elements to be switched individually or in groups or for operating the sensor elements in a fashion synchronized with the semiconductor light sources (diagrammatically illustrated in FIG. 4). The sensor elements 3 can be antennas connected to a transceiver unit (5) (see also FIG. 4).

Novel systems for measuring distance and/or determining visibility can be implemented in conjunction with the multifunctional illumination device according to the invention, it being possible in such systems, in particular, to implement the front end (light source and sensor) in a particularly compact fashion. Again, owing to the integration of photodiodes in the multifunctional illumination device it is possible to measure the ambient light precisely with the aid of that illuminator which is intended to provide the light power required for compensating weak ambient light.

In particular, systems for night vision improvement that operate on the basis of active infrared or ultraviolet ambient illumination can be implemented in a space-saving fashion and in a robust design in a compact unit.

Again, particularly given integration of millimeter wavelength antennas, the multifunctional illumination device is suitable for detecting objects in the surroundings of the device using the radar principle.

The invention claimed is:

1. A multifunctional illumination device, in particular for use in a motor vehicle, wherein
   the luminous means of the illumination device are formed by an arrangement of a multiplicity of semiconductor light sources (2) grouped to form an array,
   sensor elements (3) are arranged instead of the semiconductor light sources (2) at individual positions of this array,
   at least one semiconductor light source (2) and at least one sensor (3) are selected from the multiplicity of semiconductor light sources (2) and sensor elements (3) and are assigned to a common optical system (1),
   the assignment with reference to the optical system (1) is performed in such a way that the optical system (1) acts on the semiconductor light source (2) and sensor (3) such that these have different emission and/or reception characteristics, and
   perpendicular to the light entry surface the individual optical systems (1) have a central region whose projection into a two-dimensional plane corresponds to a cylindrical 2-dimensional Cartesian oval.

2. The multifunctional illumination device as claimed in claim 1,
   wherein the semiconductor light sources (2) emit light in different wavelength regions.

3. The multifunctional illumination device as claimed in claim 1, wherein optical systems (1) assigned to the individual semiconductor light sources (2) are designed as flat elements whose light entry opening have an elongated, substantially rectangular shape.

4. The multifunctional illumination device as claimed in claim 3, wherein the central region of the optical systems (1) is combined with a parabolic reflector.

5. The multifunctional illumination device as claimed in claim 1, wherein the illumination device comprises a means enabling the individual semiconductor light sources (2) and the sensor elements (3) to be switched individually or in groups.

6. The multifunctional illumination device as claimed in claim 1, wherein the specific sensor elements (3) are assigned to specific semiconductor light sources (2), and a means is provided for operating the sensor elements (3) in a fashion synchronized with the semiconductor light sources (2) assigned to them.

7. The multifunctional illumination device as claimed in claim 1, wherein the sensor elements (3) are photodiodes.

8. The multifunctional illumination device as claimed in claim 1, wherein the sensor elements (3) are antennas.

9. The multifunctional illumination device as claimed in claim 8, wherein the antennas (3) are connected to a transceiver unit.

10. The multifunctional illumination device as claimed in claim 2, wherein the semiconductor light sources (2) emit light in both the visible wavelength region and the infrared wavelength region.

11. A method for operating a multifunctional illumination device wherein the luminous means of the illumination device are formed by an arrangement of a multiplicity of semiconductor light sources grouped to form an array, sensor elements are arranged instead of the semiconductor light sources at individual positions of this array, at least one semiconductor light source (2) and at least one sensor (3) are selected from the multiplicity of semiconductor light sources (2) and sensor elements (3) and are assigned to a common optical system (1), the assignment with reference to the optical system (1) is performed in such a way that the optical system (1) acts on the semiconductor light source (2) and sensor (3) such that these have different emission and/or reception characteristics, and perpendicular to the light entry surface the individual optical systems (1) have a central region whose projection into a two-dimensional plane corresponds to a cylindrical 2-dimensional Cartesian oval, the method comprising:

driving the sensor elements (3) and semiconductor light sources (2) independently individually or in groups.

12. The method as claimed in claim 11, wherein individual sensor elements (3) are operated synchronously with semiconductor light sources (3) assigned to them.

13. The method as in claim 11, wherein said multifunctional illumination device is operated for the purpose of measuring distances and/or determining visibility.

14. The method as in claim 11, wherein said multifunctional illumination device is operated for the purpose of measuring the ambient light.

15. The method as in claim 11, wherein said multifunctional illumination device is operated in a system for improving night vision that operates on the basis of active infrared or ultraviolet ambient illumination.

16. The method as in claim 11, wherein said multifunctional illumination device is operated as a vehicle-to-vehicle communication system in a motor vehicle.

17. The method as in claim 11, wherein said multifunctional illumination device is operated for the purpose of detecting objects in the surroundings of the device using the radar principle.

* * * * *